United States Patent [19]

Lund

[11] Patent Number: 5,364,211

[45] Date of Patent: Nov. 15, 1994

[54] SIDE RAIL ANCHOR BAR

[76] Inventor: Gary J. Lund, P.O. Boz 22, Lodi, Calif. 95241-0022

[21] Appl. No.: 205,088

[22] Filed: Mar. 3, 1994

[51] Int. Cl.⁵ .............................................. B60P 7/08
[52] U.S. Cl. .................................... 410/108; 410/115
[58] Field of Search ............... 410/101, 106, 108, 110, 410/115; 296/36; 248/499, 503; 24/265 CD, 68 CD, 115 K

[56] References Cited

U.S. PATENT DOCUMENTS

| | | | |
|---|---|---|---|
| 3,521,443 | 7/1970 | Dragonuk . | |
| 4,072,113 | 2/1978 | Thurston | 24/115 K X |
| 4,229,132 | 10/1980 | Taylor | 410/115 |
| 4,248,558 | 2/1981 | Lechner | 410/115 X |
| 4,531,774 | 7/1985 | Whatley | 248/499 X |
| 4,812,093 | 3/1989 | Millar, Jr. | 410/110 |
| 4,818,162 | 4/1989 | Zukowski et al. . | |
| 4,842,458 | 6/1989 | Carpenter . | |
| 4,850,769 | 7/1989 | Matthews | 410/110 X |
| 4,850,770 | 7/1989 | Millar, Jr. . | |
| 4,883,208 | 11/1989 | Bott . | |
| 5,302,064 | 4/1994 | Davis | 410/101 X |

Primary Examiner—Michael S. Huppert
Assistant Examiner—Stephen Gordon

[57] ABSTRACT

A vehicular pickup truck bed is arranged to include an anchor bar structure having tie-down fingers projecting therefrom, wherein the tie-down fingers extend from a side wall of the anchor bar exteriorly of the pickup truck bed and below a bottom wall of the anchor bar. The anchor bar is arranged for mounting to the pickup truck top wall or side wall in use.

2 Claims, 2 Drawing Sheets

SIDE RAIL ANCHOR BAR

BACKGROUND OF THE INVENTION

1. Field of the Invention

The field of invention relates to tie-down bar structure, and more particularly pertains to a new side rail anchor bar wherein the same is arranged for the securement to a pickup truck bed permitting ease of securement of cargo within the associated pickup truck bed.

2. Description of the Prior Art

Tie-down apparatus of various types are utilized in the prior art and such is exemplified by the U.S. Pat. 4,883,208; 4,842,458; 3,521,443; 4,850,770; and 4,818,162.

The instant invention attempts to overcome deficiencies of the prior art by providing for an apparatus arranged for ease of use and adaption relative to pickup truck beds in various forms and in this respect, the present invention substantially fulfills this need.

SUMMARY OF THE INVENTION

In view of the disadvantages inherent in the known types of tie-down structure now present in the prior art, the present invention provides a side rail anchor bar wherein the same is arranged for mounting to a side rail of a pickup truck bed in use.

To attain this, the present invention provides an anchor bar structure for use with a vehicular pickup truck bed, the anchor bar structure having tie-down fingers projecting therefrom, wherein the tie-down fingers extend from a side wall of the anchor bar exteriorly of the pickup truck bed and below a bottom wall of the anchor bar. The anchor bar is arranged for mounting to the pickup truck top wall or side wall in use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new side rail anchor bar which may be easily and efficiently manufactured and marketed.

It is a further object of the present invention to provide a new side rail anchor bar which is of a durable and reliable construction.

An even further object of the present invention is to provide a new side rail anchor bar which is susceptible of a low cost of manufacture with regard to both materials and labor, and which accordingly is then susceptible of low prices of sale to the consuming public, thereby making such side rail anchor bars economically available to the buying public.

Still yet another object of the present invention is to provide a new side rail anchor bar which provides in the apparatuses and methods of the prior art some of the advantages thereof, while simultaneously overcoming some of the disadvantages normally associated therewith.

Even still yet another object of the present invention is to provide a new side rail anchor bar which includes tie-down fingers projecting therefrom, wherein the tie-down fingers extend from a side wall of the anchor bar exteriorly of the pickup truck bed and below a bottom wall of the anchor bar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
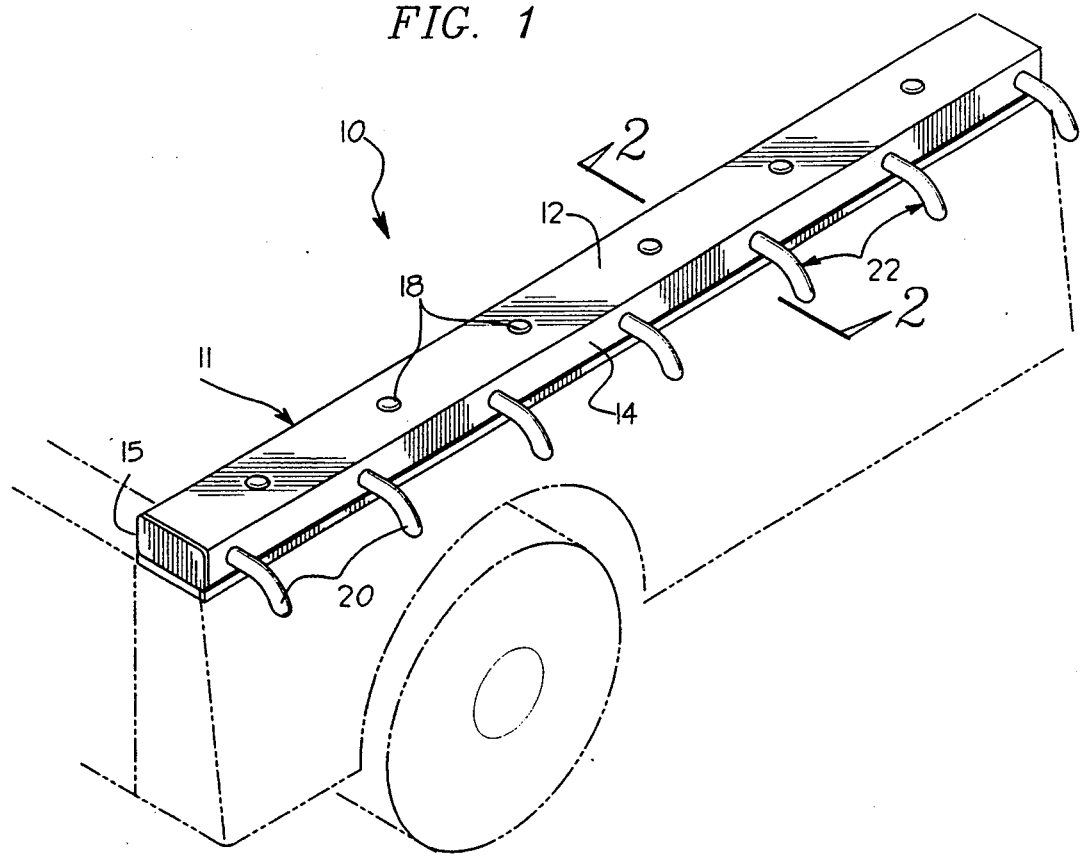
FIG. 1 is an isometric illustration of the invention.

With reference now to the drawings, and in particular to FIGS. 1–4 thereof, a new side rail anchor bar embodying the principles and concepts of the present invention and generally designated by the reference numeral 10 will be described.

Figure 2:
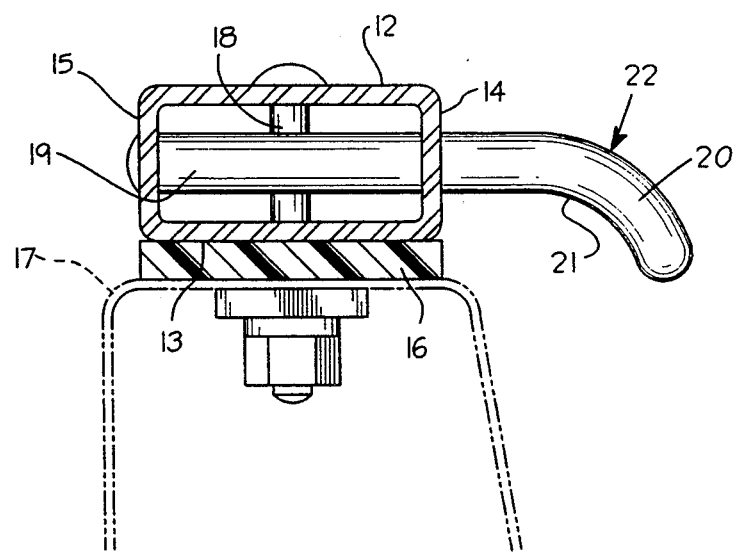
FIG. 2 is an orthographic view, taken along the lines 2—2 of FIG. 1 in the direction indicated by the arrows.
Figure 3:
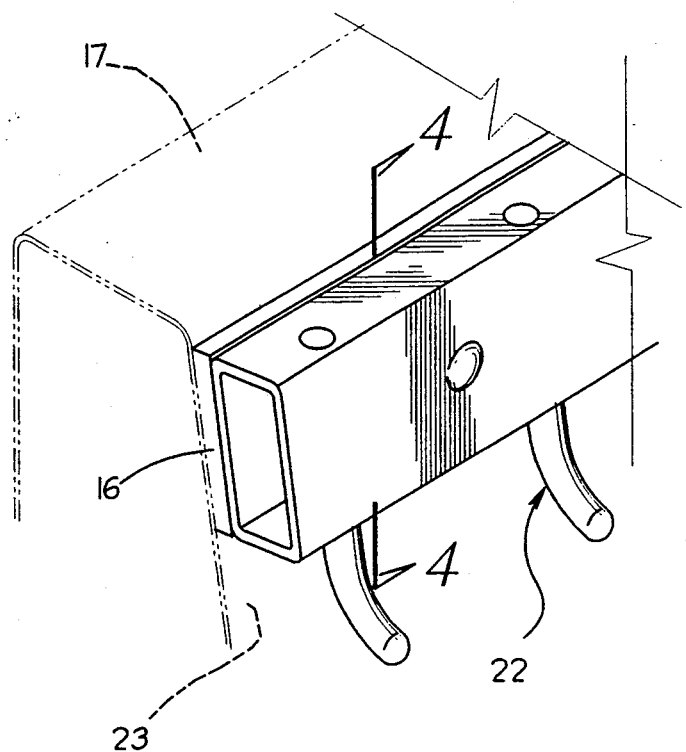
FIG. 3 is an isometric illustration of the invention mounted to a pickup truck bed outer side wall.
Figure 4:
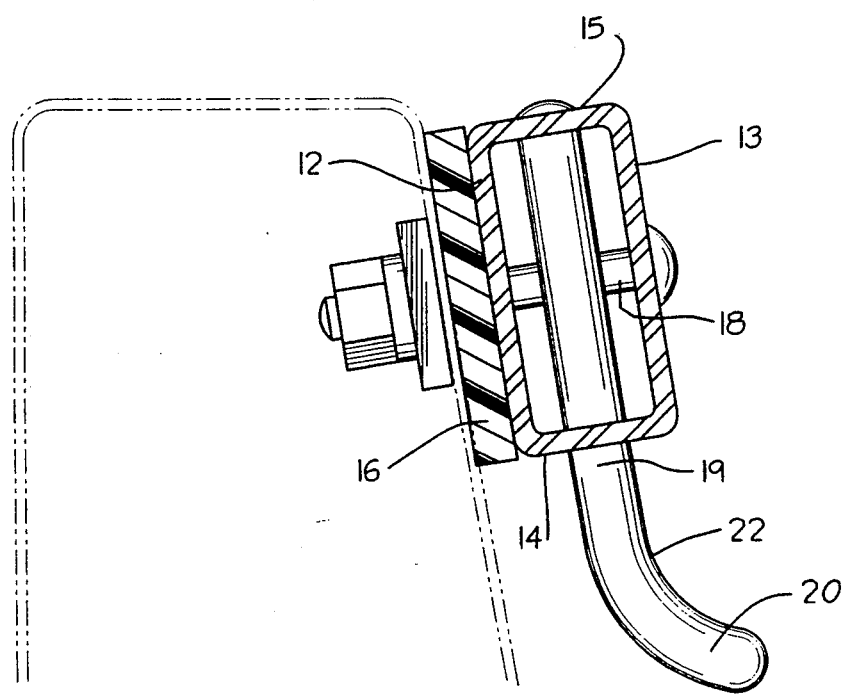
FIG. 4 is an orthographic view, taken along the lines 4—4 of FIG. 3 in the direction indicated by the arrows.

More specifically, the side rail anchor bar 10 of the instant invention comprises a rigid tube rail 11 arranged for mounting to a vehicle bed rail top wall 17, as indicated in FIGS. 1 and 2, or alternatively to the vehicle rail outer wall 23, as illustrated in FIGS. 3 and 4. The tube rail 11 includes a top wall 12 spaced from a bottom wall 13 in a parallel relationship, as well as a first side wall 14 spaced from a second side wall 15. A cushion web 16 is arranged for mounting coextensively between the rigid tube bottom wall 13 and the vehicle bed top wall 17, or alternatively between the tube rail top wall 12 and the vehicle rail outer wall 23. It should be understood that in the construction of FIG. 4, the rail 11 may be turned such that the cushion web 16 is mounted between the rail bottom wall 13 and the outer wall 23 should it be desired that the hook members 22 be arranged for projecting towards the outer wall 23 rather than away from the outer wall. To secure the rail 11 to the truck bed, plural fasteners 18 extend through the top and bottom walls 12 and 13 respectively, as well as through the vehicle bed rail top wall 17 or the vehicle rail outer wall 23.

As best illustrated in FIGS. 2 and 4, a row of parallel support rods 19 are fixedly mounted through the tube rail 11 extending from the second side wall 15 through the first side wall 14 projecting exteriorly therefrom. Each of the support rods 19 includes an arcuate outer end portion 20 projecting from the first side wall 14 to an orientation beyond the rail bottom wall 13, such that each concave surface 21 of the hook members 22 is arranged to secure a tie-down cord and the like (not shown) in a non-slip manner, and further to prevent the cord from slipping along the concave surface 21 resulting in possible inadvertent removal from the hook member 22.

As to the manner of usage and operation of the instant invention, the same should be apparent from the above disclosure, and accordingly no further discussion relative to the manner of usage and operation of the instant invention shall be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A side rail anchor bar arranged for mounting to a vehicle bed rail, said anchor bar comprising:
    a rigid tube rail, the tube rail including a top wall spaced from and parallel to a bottom wall, a first side wall spaced from a second side wall, said first and second side walls being attached to the top and bottom walls to form an open tube;
    a cushion web arranged for coextensive and contiguous communication with the bottom wall to protect the vehicle bed rail from direct contact with the tube rail;
    a plurality of fasteners directed orthogonally through the top wall and the bottom wall and through the cushion web for securement to the bed rail; and,
    a plurality of hook members arranged in a parallel relationship through the tube rail, wherein the hook members each include a support rod extending fixedly from the second side wall through the first side wall and projecting beyond the first side wall, each support rod having an arcuate outer end portion projecting from the first side wall to an orientation beyond the bottom wall.

2. An anchor bar as set forth in claim 1, wherein said plurality of hook members comprises seven hook members.

* * * * *